United States Patent [19]

Huffman

[11] 4,210,677
[45] Jul. 1, 1980

[54] PROCESS FOR PRODUCTION OF A RESTRUCTURED FRESH MEAT PRODUCT

[75] Inventor: Dale L. Huffman, Auburn, Ala.

[73] Assignee: Auburn Research Foundation, Auburn, Ala.

[21] Appl. No.: 872,024

[22] Filed: Jan. 24, 1978

[51] Int. Cl.$^2$ ............................................. A23L 1/31
[52] U.S. Cl. ........................................ 426/272; 17/45; 426/641; 426/513; 426/518
[58] Field of Search ............... 17/25, 46, 45; 426/518, 426/519, 641, 646, 645, 513, 393, 264, 104, 272

[56] References Cited

U.S. PATENT DOCUMENTS

| | | | |
|---|---|---|---|
| 2,527,493 | 10/1950 | Condon | 426/641 |
| 2,673,156 | 3/1954 | Minder | 426/518 X |
| 2,812,260 | 11/1957 | Keane et al. | 426/518 X |
| 2,823,127 | 2/1958 | Gwilliam et al. | 426/518 X |
| 3,063,842 | 11/1962 | Podebradsky | 426/646 |
| 3,077,215 | 2/1963 | Kentor | 17/25 |
| 3,100,713 | 8/1963 | Grant | 426/518 X |
| 3,677,775 | 7/1972 | Vogel | 426/393 |
| 3,890,451 | 6/1975 | Keszler | 426/513 |
| 4,029,824 | 6/1977 | Langen | 426/519 X |
| 4,072,763 | 2/1978 | Mart | 426/513 |

Primary Examiner—Kenneth M. Schor
Attorney, Agent, or Firm—Shoemaker and Mattare, Ltd.

[57] ABSTRACT

A process for restructuring meat wherein chunked and wafer sliced meats are blended to promote release of natural binding proteins. The blended meats are formed into log shapes for freezing and tempering, and then pressed into shape and sliced into steaks or chops. The process produces a roast if the final slicing step is eliminated.

25 Claims, 1 Drawing Figure

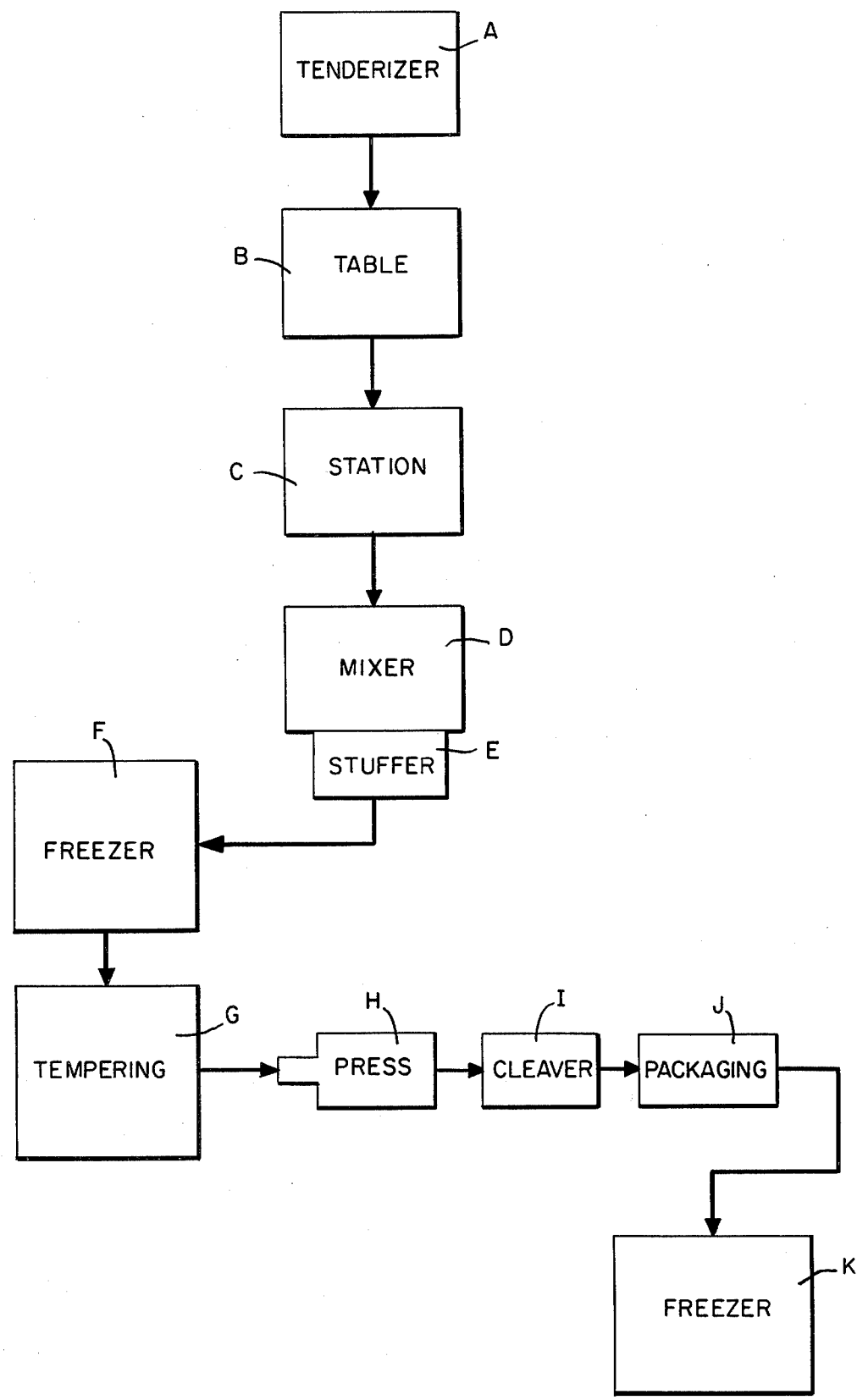

PROCESS FOR PRODUCTION OF A RESTRUCTURED FRESH MEAT PRODUCT

BACKGROUND OF THE INVENTION

The present invention relates, in general, to methods of restructuring meat, and, more particularly, to methods of restructuring fresh meat into uniform portions to be used for steak and roasting cuts.

The trend to produce increasing amounts of beef on less grain and more roughage is a reality that seems inevitable, and the current trend toward consumption of increasing amounts of fresh beef as hamburger is well documented. It has been reported that the American public spent 44 billion dollars in 1976 eating away from home. Hamburger, as a percent of total beef consumed in the United States, has increased from 36% to 43% since 1972. The need for a satisfactory fresh pork item analogous to hamburger has been repeatedly emphasized. Furthermore, the hotel-restaurant-institutional (HRI) and retail industries are both placing more pressure on meat packers and purveyors to provide them with portioned cuts of beef and pork that are uniform in size, shape, weight, density and have the desired sensory attributes including texture, tenderness, juiciness and flavor. In short, the HRI industry wants uniform size and quality so that a specific image for a product at a given cost for raw materials can be projected.

To satisfy the increased demand for meat while fulfilling the requirements imposed on meat production by the grain and roughage constraints, several processes have been developed. Among those processes in processing of beef into hamburger. While leaner, younger beef can be ground and processed into conventional hamburger items, these known processes do not provide the benefits to the beef industry of products that are similar to roast and steak cuts.

A recent innovation involves flake-cutting of meat and restructuring the resultant flaked meat into steak-like items, and flaked and formed steaks and chops have received some degree of acceptance; however, these items more closely resemble ground product than sectioned and formed steaks or chops.

Similar processes exist for restructuring of pork, lamb, mutton, veal, chicken and turkey into sausages, loaves and similar processed meat items. However, none of the processes embodying the teachings of the prior art adequately reproduce the desired textural properties of the respective fresh meat item. For example, the cured meat industry has produced a sectioned and formed ham by "salting out" the muscle proteins during processing to form a matrix which is subsequently stabilized by heating.

Tenderness is the textural property of meat that is most difficult to assess in the raw state and the most illusive and the most frequently cited as the reason for rejection in the cooked state. A method of producing a cut that is uniform in size, shape, density, fat content and sensory properties (particularly tenderness) is to be greatly desired.

The inventor is aware of prior art teaching processing of meat in which pieces or chunks of uncooked whole, unground meat are cured, subjected to a form of mechanical working to partially grind the meat so the pieces of meat become soft and pliable with a tacky exudate formed on the surfaces thereof. However, the tenderizing of such pieces of meat is not performed with a mechanical tenderizer, but is performed using chemicals, such as salt and phosphates, or the like, and, such chemical treatment is undesirable for many reasons. Such reasons include use by persons on salt-free diets is prohibited, production of "off-flavors", rancidity, and the like. The restructured meat produced by the presently disclosed process does not require the addition of salts, phosphates, or enzymes. Furthermore, the known processes require some aging of the meat to achieve desired flavor, texture, tenderness, and the like which has concomitant drawbacks to the meat processor. Such drawbacks are tieup of freezer space, high energy usage, and the like.

Contrasted to the known methods of tenderizing, the process embodying the teachings of the present invention tenderizes using mechanical means which permits extraction of muscle protein in addition to tenderizing the meat. Muscle protein thus extracted from the cells in the inventive process serves to bind the meat together.

The inventor is also aware of processes used to form food such as hot dogs and like sausage-type items, wherein the meat matrix is stabilized by heating. In contrast to such methods, the process embodying the present invention uses fresh meat which is not heated and which is held together by the muscle proteins extracted in the mechanical tenderizing step.

As the restructured meat produced by the inventive process uses unheated meat, the meat remains "fresh" as opposed to the meat being cured or the like which results from the known process which heat the meat. Furthermore, the "fresh" meat used in the inventive process produces a restructured product having a flavor which accurately and closely approaches an "ideal" flavor. Heretofore, restructured meats have suffered from the drawback of an "off-flavor". The use of fresh, unheated meat in the inventive process enables the restructured meat to be formed without the so-called "pre-cooking" related problem of "off-flavor". As the meat is never "cooked" during the inventive process, an "off-flavor" is never developed.

The inventor is also aware of prior art teaching various methods of tendering meat. However, none of these known methods mechanically tender the meat in a restructuring process, and therefore suffer the above-discussed drawbacks of "off-flavor" and the like.

The process embodying the teachings of the present invention produces a restructured meat product having uniform size, shape, density and fat content coupled with desired textural properties immediately after exsanguination. The inventive process uses meat which is processed immediately after exsanguination and thus as an additional advantage thereof, overcomes the just-mentioned drawbacks inherent in those known process requiring the use of aged meat to produce desired flavor, texture, and the like.

SUMMARY OF THE INVENTION

The process embodying the teaching of the present invention combines mechanically tenderized chunks and thinly sliced meat and turns them into restructured chops and steaks. Raw materials are not ground, so that the final product looks like and has the "bite" more of muscle meat than either ground or flaked and formed products.

In accordance with the teachings of the present invention, red meat and poultry muscle is boned, defatted and tenderized by use of a mechanical means, one or more times, preferably four times, placed in a mixing device such as a double-action mixer or other commonly used devices such as a massager or tumbler, with or without (preferably without) salt, phosphates, enzymes and flavorants; mixed for varying periods of time, such as 15 to 30 minutes in a double-action mixer or 4 to 6 hours in a tumbler or massager; preformed into logs; freeze tempered to an internal temperature of between 22° F. and 24° F.; pressed to a desired shape at 350 to 500 psi; sliced on a slicer such as a power cleaver or similar device; packaged and placed in freezer storage.

A review of the muscle biochemistry involved in the invention is briefly presented for the sake of convenience. When an animal is exsanguinated and normal body functions cease, a sequence of events begins to occur that have been termed rigor mortis. Only recently have the events of rigor mortis been partially elucidated and the complete sequence is still not fully understood. There are differences in the rigor syndrome among the several species of meat producing animals and fowl; however, these differences are not of the magnitude to be of concern in the present disclosure.

All of the aforementioned species contain three general groups of proteins in the lean portion: sarcoplasmic proteins, myofibrillar proteins and connective tissue proteins. The myofibrillar proteins are salt soluble and are largely responsible for binding processed meats, hams and the like together. Some of the principle myofibrillar proteins are myosin, actin and actomyosin. The meat industry designates this group of proteins as "myosin protein".

The sarcoplasmic proteins are soluble in water and weak salt solutions. These proteins provide binding in processed meats; however, not to the extent of the myofibrillar proteins.

The connective tissue proteins, such as collagen, elastin and reticulin are relatively insoluble and provide no binding.

During the rigor mortis syndrome, the muscle proteins contract, forming complexes, i.e. actomyosin is formed by the combination of actin and myosin. Such alteration of muscle proteins lessens the binding ability of the myofibrillar proteins. As the rigor syndrome continues, further alteration of muscle proteins takes place during the process that is known as "aging".

The aging process involves gradual breakdown of muscle proteins and resultant improvement in tenderness and textural properties of meat. This aging process is affected by temperature, time and level of sanitation. Aged meat may have more desirable eating qualities than fresh meat, but aging is an expensive process in terms of refrigerated space, inventory turnover and attendant spoilage problems. In addition, aged meat has lower binding properties than fresh meat.

Accordingly, the prior art processes which require aging suffer the drawbacks discussed above.

In the process embodying the teachings of the present invention, mechanical tenderizing and subsequent mixing release the myosin-type proteins that serve as binding agents to bind the meat-mass back together during the remainder of the process. Additionally, the release of the myosin-type proteins and subsequent binding the meat-mass can be accomplished with no additives. It is, of course, apparent to those skilled in the art that the binding of the meat-mass can be enhanced by addition of salt and/or phosphates. However, the mechanical tenderizer used in the present invention breaks down the cell to release the myosin-type proteins in a quantity sufficient to permit binding without the need of such additives. Furthermore, it is noted that, in the process of the present invention, the addition of proteolytic enzymes such as papain, bromelain and ficin will enhance the binding ability of the process when used alone, or in combination with salt, phosphates and other flavorants.

It is further noted that the process of the present invention works especially well with either hot-boned or chilled pork, but can also be used with beef and chicken or turkey. Muscle quality is retained by the use of raw material in chunks, and because the meat is mechanically tenderized before being cubed, more economical cuts can be used. Slicing meat wafer thin enables the product to bind well due to the large exposed meat surface area. The wafer sliced intra- and intermuscular fat is in such a form that it can be evenly dispersed throughout the product in the blending process.

In the process embodying the present invention, there are numerous variations in the basic procedure; some of these are applicable only to the species, muscle or cut of the meat indicated, while others have broader application.

OBJECTS OF THE INVENTION

It is accordingly a main object of the present invention to assure the size, shape, density, fat content, and sensory properties of a restructured fresh meat product.

It is a further object of the present invention to alter the sensory properties of red meat and poultry by changing the sequence of events that occur during the processing of the respective product.

It is still a further object of the present invention to alter the sensory properties of red meat and poultry by the addition of enzymes and flavorants during the process.

It is a specific object of the present invention to use a mechanical tenderizing step in a process of forming restructured fresh meat products.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWING

The FIGURE shows a flow chart illustrating the steps included in the process embodying the teachings of the present invention.

DETAILED DESCRIPTION OF THE INVENTION

The process embodying the teachings of the present invention is basically indicated in the flow chart shown in FIG. 1. Broadly, the process includes the steps outlined below. The process will be described first for pork, followed by a description of the process using beef. Referring to the Figure, it is seen that the process comprises the following steps.

For pork the process includes the following steps:

1. Boston butts are boned, frozen and tempered to an internal temperature of approximately 30° F. and sliced wafer thin, to a thickness of 1-2 cm., on a power cleaver or slicer.

2. Boneless fresh hams are defatted and tenderized in step A one to four times with a reciprocating blade tenderizer at the 1 inch setting, then moved onto table B and cut into 2-3 inch cubes, and the excess connective tissue and gristle are trimmed off at step C. The four passes through the mechanical tenderizer ensures tenderness of the product as well as better extraction of the myosin-type proteins for binding. Both chilled and hot-boned hams have been used successfully to produce these tenderized chunks.

3. Equal weights of the wafer sliced butts and tenderized cubed meat are combined in a mixer at step D, and the meat mass is blended for 15 minutes during which time salt, Tri-Polyphosphate or water may be added.

4. The meat is removed from the mixer, preformed at step E into approximately the desired shape, which may be, for example, a log-like cylinder, wrapped with PVC film and placed in a sharp freezer at step F.

5. The frozen logs are tempered at step G to an internal temperature of approximately 22-26° F., which requires 32-48 hours in a tempering room.

6. The logs are then pressed at step H into the desired shape at 500 psi.

7. The logs are sliced at step I to the desired thickness with a power cleaver using a 20° blade, and the slices are packaged at step J and returned to the freezer at step K.

For beef the process includes the following steps:

1. Choice chucks are boned, frozen and tempered to an internal temperature of approximately 30° F. and sliced wafer thin, to a thickness of 1-2 cm., on a power cleaver or slicer.

2. Boneless standard rounds are defatted and tenderized in step A one to four times with a reciprocating blade tenderizer at the 1 inch setting, then moved onto table B and cut into 2-3 inch cubes, and the excess connective tissue and gristle are trimmed off at step C. The four passes through the mechanical tenderizer ensures tenderness of the product as well as better extraction of the myosin-type proteins for binding. Both chilled and hot-boned rounds have been used successfully to produce these tenderized chunks.

3. Equal weights of the wafer sliced butts and tenderized cubed meat are combined in a mixer at step D, and the meat mass is blended for 15 minutes during which time salt, Tri-Polyphosphate or water may be added.

4. The meat is removed from the mixer, preformed at step E into approximately the desired shape, which may be, for example, a log-like cylinder, wrapped with PVC film and placed in a sharp freezer at step F.

5. The frozen logs are tempered at step G to an internal temperature of approximately 22-26° F., which requires 32-48 hours in a tempering room.

6. The logs are then pressed at step H into the desired shape at 500 psi.

7. The logs are sliced at step I to the desired thickness with a power cleaver using a 20° blade, and the slices are packaged at step J and returned to the freezer at step K.

It is noted that for beef, chucks are preferred partially because of the economic advantages realized.

It is possible to use 100% chunked raw material, but use of such material makes it difficult to obtain the desired fat content and fat distribution throughout the cut. For instance, a restructured beef steak can be made from USDA standard beef rounds that have been tenderized four times, using the inventive process. Binding is still achieved by the rupturing of cells by the action of the blade tenderizer and subsequent mixing; however, very lean raw material does not produce the desired fat level which is an element in flavor and juiciness of the product. Otherwise, such material can be used in the present process without departing from the teachings of the present disclosure.

Frozen, tempered and flaked cut fat can also be used; however, the fat contained therein tends to collect into little balls during mixing. Accordingly, when frozen, tempered and flaked cut products are used, the process herein disclosed can include steps wherein various liquid emulsions are injected into lean meat prior to tenderization to alleviate this just-mentioned problem.

Satisfactory binding is produced with tenderizing four times and subsequent mixing, but in recombining thin cuts such as flanks, briskets and tri-tips, binders may be useful. Accordingly, the process can be modified to include the addition of such binders without departing from the teachings of the present disclosure. For example, cow tenders have been tenderized, mixed, pressed and sliced after all silver skin is removed and tenders have been properly preformed.

It is further noted that restructured products can also be made using boneless chicken and turkey meat. In an embodiment wherein chicken is restructured, the process includes the following steps. Meat from chicken breasts and thighs is passed through a reciprocating blade tenderizer one or more times at a one inch setting, then mixed at least 15 minutes with water, flour and flavorants. The meat is then preformed, freeze-tempered, pressed and sliced.

For a turkey product, the process includes the steps of providing boneless breast muscles that have been trimmed free of skin and connective tissue. The breast muscles are tenderized at least once, mixed for at least 15 minutes, preformed, freeze-tempered, pressed and sliced. Thigh meat can be used to replace part of the breast muscle. During mixing, 0.75% salt by weight and 1% water by weight, flour and flavorants can be added.

SELECTION AND PREPARATION OF RAW MATERIALS

As mentioned in Step 1 of the process outline, the raw materials were a combination of wafer sliced and tenderized cubed muscle meat. For illustration the preparation of raw materials for a restructured pork chop will be discussed. To produce the wafer slices boston butts are boned, frozen, tempered and sliced on a power cleaver 1-2 cm. thick. These thin slices bind well due to their large surface area and the wafer sliced intra- and intermuscular fat is in such a form that it can be evenly dispersed throughout the product in the blending process, as will be later discussed.

The tenderized ham comes from whole boneless hams which are run four times through a Bettcher Model TR-2 tenderizer set at the 1" setting. After being tenderized the hams are cubed into 2-3 in.$^2$ cubes (at that time excess connective tissue and gristle are trimmed off). The four passes through the mechanical tenderizer ensures tenderness of the product as well as better extraction of the myosin-type proteins. Both chilled hams and hot processed ham have been used successfully to produce these tenderized chunks.

These raw ingredients are then combined in a ratio of 50—50 to achieve the desired batch size and blended.

The raw material preparation discussed was for pork, but beef has also been used successfully in the manufacture of a restructured product. In beef, as in pork, the batches might include 50% wafer sliced and 50% tenderized chunks. Both top round and chucks have been used to produce the wafer slices and chunks. At this point the tendency is to lean toward the use of chucks partly because of the economics involved.

The above discussion was directed to the use of this process to manufacture chops and steaks; however, this process has been used experimentally to manufacture both beef and pork roasts. In fact, to manufacture as a roast one need only omit slicing after pressing. If these roasts are wafer sliced after cooking, they make quite a tasty sandwich. This last result occurs because wafer slicing of cooked meats helps to increase the overall satisfaction of flavor, juiciness and tenderness.

COOKING PROCEDURES

Both beef and pork products have been successfully cooked by charbroiling, griddle broiling, griddle frying and roasting. The beef steaks were most successfully cooked by charbroiling approximately 15 minutes with them being turned three times during the cooking process. Restructured pork chops were cooked most successfully by griddle frying at a temperature of 300° F. for approximately 16 minutes. The pork "chops" were turned several times during the cooking process to ensure eveness of heat penetration. One advantage for HRI users is that this product may be cooked from the frozen state. This would enable operators to have steaks and chops in frozen storage and remove only those needed for immediate cooking, eliminating the problem of shortages and "leftover" cuts so often experienced when fresh cuts are used.

It is emphasized that in the process embodying the present invention, raw materials are not ground, and therefore the final product looks like muscle meat. Furthermore, the cooked product has a "mouth feel" more like muscle meat than either ground or flaked and formed meats.

Satisfactory products have been manufactured with no wafer sliced material; however, it is difficult to obtain the desired fat content and the correct distribution of fat throughout the cut. For example, a very desirable beef steak can be manufactured from USDA standard beef rounds that are tenderized 4 times at the 1 inch setting, chunked and processed as outlined earlier. Binding is achieved by the rupturing of cells by the action of the blade tenderizer and subsequent mixing. The problem with using very lean raw materials is that it is difficult to attain the desired fat level. However, it may be possible to overcome this problem by injecting various lipid emulsions into the lean meat prior to tenderization.

Various binders can also be added; however, it has been found that desired binding can be achieved by 4X tenderization with subsequent mixing. In work with recombining thin cuts (such as flanks, briskets, tri-tips, etc.) to produce restructured steaks, binders may be useful. Cow tenders have been tenderized, mixed, pressed and sliced with some success provided all silver skin is removed and tenders are properly preformed.

Boneless pork loins and similar cuts can be bound together with wheat gluten and similar binders. The inventor has used boneless sirloin ends of pork loins that are tenderized, mixed and stuffed into a 3 inch diameter casing, and the process of the present invention can mechanically accomplish this binding using a stuffer, such as the Vemag, with these products in the same manner as sectioned and formed hams.

As mentioned above, these restructured products have rated high on taste panels. However, the process can be further refined by using additives, extenders, various storage times, mixing times, cooking procedures and raw material preparation without departing from the teaching of the present invention.

SPECIFIC EXAMPLES

1. A preformed beef steak was manufactured by removing the bones and defatting USDA Standard beef rounds, taking special precaution in the removal of the major portion of the inter-muscular connective tissue. The round was hand cut into random sized chunks averaging about 3 to 4 pounds. These chunks were tenderized three times with a Bettcher TR-2 blade tenderizer on a 1 inch setting. The meat was then placed in a mechanical mixer and mixed for 10 minutes to 15 minutes. During the mixing process, due the friction heating, the meat-mass warmed to an approximate temperature of 45° F., thereby producing extraction of myosin-type proteins. The meat-mass was quite "tacky" at the end of the mixing period. The meat-mass was hand-formed into cylindrical shapes resembling logs which were approximately $3\frac{1}{2}$ inches in diameter. Each log weighed approximately 5 pounds. The logs were blast frozen ($-30°$ F.) and tempered to an internal temperature of 26° F. (In future examples, this process will be termed "freeze-tempered"). The logs were pressed in a model 70 Bettcher press using the 350 die at 500 psi pressure. The resultant log was sliced on the Bettcher model 39 power cleaver using a 20° blade. The steaks were cut 11/16 of an inch to yield a steak that had a constant weight of 4 ounces. Steaks were freezer wrapped and returned to the $-30°$ F. freezer.

A trained, six member sensory panel evaluated steaks that were broiled on a Charm-Glo gas broiler to a medium degree of doneness and found them to be highly acceptable in terms of tenderness, flavor, juiciness and overall acceptability. Textural properties were further evaluated with the Kramer shear instrument and found to be comparable to steaks cut from the sirloin of top Good and Low Choice cattle. The textural properties of subsequent test batches were altered by changing the degree of blade tenderization, the type of mixer, the time of mixing and the addition of salt, phosphates and flavorants.

2. In an experiment similar to that indicated in number one above, pork muscle was removed from the sirloin and ham of market weight pigs on the second day after slaughter. The muscle was treated in the same manner as previously indicated for beef. The resultant "pork chops" were judged to be comparable to boneless pork chops when prepared in the same manner.

3. Similar experiments were conducted with utility lamb legs, turkey thigh muscle and boneless chicken parts with similar results.

4. In the above instances, further experimentation was conducted to determine the technique for achieving the desired fat (or marbling) in the finished product. Experiments have been conducted where the levels of fat as determined by acceptable chemical methods (ether extract) in the final product varied from approximately three weight percent for pork to twelve weight percent for beef. An advantageous feature of the herein disclosed process is that the fat can be uniformly dispersed at any level to provide the desired textural and sensory properties in the final product.

5. A series of experiments were conducted to demonstrate the utility of the process of the present invention related to traditionally low value portions of the meat animal. The tests described here serve to illustrate specific applications of the inventive process and are not intended to be limitations thereon. Ingredients used were beef weasand meat, beef inside skirt muscle, beef outside skirt muscle, beef hanging tender meat, beef hearts, flour, salt and enzyme tenderizer. The equipment used in these tests included the Bettcher TR-2 tenderizer, Leland double action mixer with paddles and ribbons, Toledo meat grinder (all meat was ground through two plates-first ⅜ inch, then ⅛ inch), Bettcher dynaform press equipped with the 650 die, Bettcher model 81 power cleaver, Koch multivac and Bettcher 850 Whizard trimmer. Preparation of the meat involved trimming all membranous tissue with the 850 Whizard trimmer or a knife; special attention was given to removal of the heavy connective tissue in the center of the hanging tender muscle. All of the skirt muscles and the hanging tenders were tenderized twice with the TR-2 blade tenderizer at the 1 inch setting. The larger portion of the weasand meat was cut into 1–2 inch chunks, the remainder, along with the hearts, was ground through the Toledo grinder, first through the ⅜ inch plate, then through the ⅛ inch plate. Ten test batches of product were made, varying the percents of the several meat ingredients, the amount of salt, enzyme tenderizer, water and time in the Leland mixer. The resultant test batches were freezer-tempered, pressed at 500 psi in the 650 die on the Bettcher dynaform, sliced into 5 ounce portions, vacuum packaged with the Koch multivac and frozen.

Evaluation of the resultant steaks indicated that an acceptable product could be produced by incorporating the tenderized muscles with ground meat and weasand meat. It is noted that the essential elements of the process embodying the teachings of the present invention are release of myosin-type proteins by the mechanical tenderizing and mixing process. Nowhere in the prior art is a mechanical tenderizing and mixing step used in the process of producing restructured beef products. Accordingly, all of the known processes require chemicals and/or aging for a tenderizing process, and thus suffer from the above-discussed drawbacks. It is theorized that addition of proteolytic enzymes may improve the product. It has been well documented in the literature that proteolytic enzymes attack the connective tissue proteins preferentially. It is theorized in this regard that synergism exists between the addition of enzymes to digest the connective tissue proteins and the release of myofibrillar and sarcoplasmic proteins by the act of blade tenderizing and mixing. It has been found that salt and water act to improve the binding properties. It is noted that low value meats from pork, mutton, lamb, veal, chicken and turkey could be substituted for the specific meats used in these tests with similar results and without departing from the scope of the present invention.

6. To demonstrate the value of the present process for improving utilization of high value meat cuts a series of tests with beef tenderloin muscles was performed. The specific objective of these tests was to produce a filet mignon steak that was uniform in size, shape, weight and density. It is known that the tenderloin muscle tapers from the sirloin end through the loin cut. Traditionally it has been difficult to make maximum utilization of this cut for filet mignon or chauteaubriand. The procedure for these tests involved removal of all silver skin, side chain and fat, then passing the tenders through a TR-2 blade tenderizer at a 3 inch setting, placing the tenderized product in a mixer and tumbling for 5 minutes. At this time, a mixture of 1% water and 0.75% salt (based on weight of the batch) was added to the meat-mass as a slurry and the batch was mixed for an additional 15 minutes. At this time, the tenders were "tacky" indicating that the combined action of tenderization, mixing and brine addition had salted-out the myofibrillar proteins. Two tenders were then placed head to tail to produce a uniform diameter product. The tenders were wrapped with polyvinylchloride film (preformed) taking care to exhaust all air space from between the meat pieces to prevent formation of ice in the product, freeze-tempered (to an internal temperature of between 22° and 24° F.), pressed using a Bettcher 300 die and 350 psi with the Bettcher dynaform press, and sliced into 4 ounce portions using the Bettcher model 81 power cleaver with a 20° blade.

Evaluation of these steaks revealed excellent adherance of the meat pieces following slicing. Excellent results were obtained in subsequent tests when tenders were tumbled in a slow action tumbler or massager rather than the mixer.

A further example of the efficacy of the process disclosed herein was established by following the procedure described above with lean pieces trimmed from the tenderloin that would normally be used for lower value product. These pieces were mixed 15 minutes with one weight percent water and 0.75 weight percent salt, preformed, freeze-tempered, pressed, sliced and evaluated for textural properties and cohesiveness (the ability to bind). Evaluation indicated a product of acceptable quality could be produced in this manner.

7. The present process was also used with boneless chicken meat. The ingredients used were meat from the breasts, thighs, chicken skin, flavorants, salt and flour. The basic procedure involved passing the muscle meat through the TR-2 blade tenderizer one time on the 1 inch setting, flaking the chilled skin on a Comitrol with a 240 head, mixing a minimum of 10 minutes in a Leland double action mixer with salt, water, flour and flavorants; meat was then preformed, freeze-tempered, pressed, sliced and evaluated. In the process, salt and skin may be omitted with excellent results. Varying the mixing time and final mixing temperature will alter the textural properties of the product.

8. Processes conducted under No. 7 above were repeated using turkey meat with similar results. A superior turkey product can be produced by utilizing boneless breast muscles that are trimmed free of skin and connective tissue (outer membrane). The breast muscles are tenderized one time with the TR-2 blade tenderizer, mixed in a double action mixer (or similar tumbler or massager) for a minimum 15 minutes, preformed, freeze-tempered, pressed, sliced and evaluated.

In this example, additional processes have been conducted, where thigh meat was used to replace a portion of the breast muscle with excellent results. Additional processes were conducted with the addition of 0.75 weight percent salt and one weight percent water, flour and various flavorants. Mixing time and temperature were varied to provide specific textural properties in the finished product.

It should be obvious to those skilled in Meat Science and Technology that many variations are possible in the basic procedure. It is noted that the central consideration in the present invention is the freeing of myofibrillar and sarcoplasmic proteins by the combined action of the blade tenderizer and mixing, resulting in the production of a restructured fresh meat or poultry product. In addition, it is theorized that the addition of proteolytic enzymes may degrade the connective tissue proteins to the extent that they will adhere to the remainder of the meat-mass. The process further includes freeze-tampering, and pressing of the product into a desired shape.

As this invention may be embodied in several forms wihtout departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A method of restructuring fresh meat comprising the steps of:
   providing fresh, unheated meat to be restructured;
   boning said meat;
   freezing said meat;
   tempering said meat to an internal temperature of approximately 26° F.;
   slicing said tempered meat into thin wafers;
   defatting other meat;
   tenderizing said other meat on a mechanical tenderizer;
   cutting said tenderized other meat into cubes;
   removing excess connective tissue and gristle from said cubes by cutting;
   combining said meat wafers and said meat cubes by mixing said meat wafers and said meat cubes;
   blending said mixed meats;
   preforming said blended meats into an initial desired shape;
   wrapping said preformed meats with a film-like material;
   freeze tempering said wrapped preformed meats such that said meats remain deformable;
   pressing said frozen meats into a final desired shape;
   slicing said pressed frozen meats into a plurality of slices; and
   freezing said slices.

2. The method of restructuring fresh meat of claim 1 wherein said wafers have a thickness of approximately 1 to 2 cm.

3. The method of restructuring fresh meat of claim 1 wherein said wafers are formed using a power cleaver.

4. The method of restructuring fresh meat of claim 1 wherein said wafers are formed using a power slicer.

5. The method of restructuring fresh meat of claim 1 wherein said cubes are approximately 2 to 3 inches on a side.

6. The method of restructuring fresh meat of claim 1 wherein the step of tenderizing said other meat includes tenderizing said other meat four times with a reciprocating blade tenderizer on a one inch setting.

7. The method of restructuring fresh meat of claim 1 wherein said meat includes Boston butts.

8. The method of restructuring fresh meat of claim 6 wherein said other meat includes fresh ham.

9. The method of restructuring fresh meat of claim 1 wherein said other meat includes chilled ham.

10. The method of restructuring fresh meat of claim 1 wherein said other meat includes hot-boned ham.

11. The method of restructuring fresh meat of claim 1 wherein said meat includes choice chuck.

12. The method of restructuring fresh meat of claim 1 wherein said other meat includes standard rounds.

13. The method of restructuring fresh meat of claim 1 wherein said other meat includes hot-boned rounds.

14. The method of restructuring fresh meat of claim 1 wherein the combining step includes combining equal weights of said meat wafers and said meat cubes.

15. The method of restructuring fresh meat of claim 1 wherein the blending step includes blending for about 15 minutes.

16. The method of restructuring fresh meat of claim 15 wherein the blending step further includes adding salt to the mixed meats being blended.

17. The method of restructuring fresh meat of claim 16 wherein the blending step further includes adding Tri-Polyphosphate to the mixed meats being blended.

18. The method of restructuring fresh meat of claim 17 wherein the blending step further includes adding water to the mixed meats being blended.

19. The method of restructuring fresh meat of claim 1 wherein said film-like material includes PVC film.

20. The method of restructuring fresh meat of claim 1 wherein said initial desired shape includes a cylindrical shape.

21. The method of restructuring fresh meat of claim 1 wherein the step of freeze tempering said wrapped preformed meats includes tempering said wrapped preformed meats to an internal temperature of approximately 22° to 26° F.

22. The method of restructuring fresh meat of claim 1 wherein the pressing step includes pressing said frozen meats at a pressure of about 350 to 500 psi.

23. The method of restructuring fresh meat of claim 1 wherein the slicing step includes use of a power cleaver having a 20° blade.

24. The method of restructuring fresh meat of claim 1 further including a step of packaging said slices prior to freezing said slices.

25. The method of restructuring fresh meat of claim 1 wherein said step of tenderizing said other meat includes tenderizing said other meat sufficiently to release proteins.

* * * * *